UNITED STATES PATENT OFFICE.

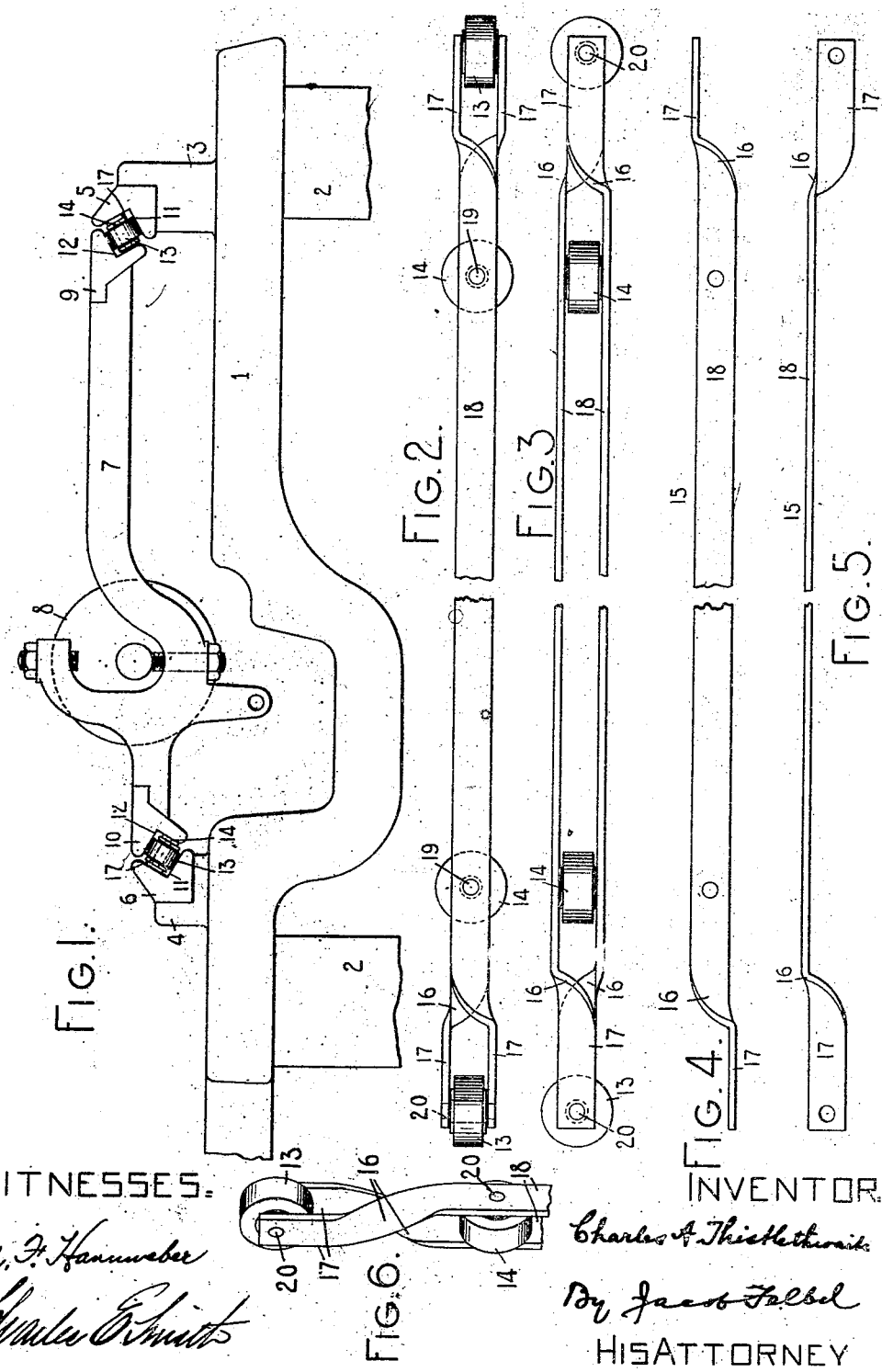

CHARLES A. THISTLETHWAITE, OF ILION, NEW YORK, ASSIGNOR TO WYCKOFF, SEAMANS & BENEDICT, OF ILION, NEW YORK, A CORPORATION OF NEW YORK.

TYPE-WRITING MACHINE.

No. 869,944.  Specification of Letters Patent.  Patented Nov. 5, 1907.

Application filed July 9, 1907. Serial No. 382,943.

*To all whom it may concern:*

Be it known that I, CHARLES A. THISTLETHWAITE, a citizen of the United States, and a resident of Ilion, in the county of Herkimer and State of New York, have invented certain new and useful Improvements in Type-Writing Machines, of which the following is a specification.

My invention relates to typewriting machines and more particularly to anti-friction roller separators which in the present instance are used for the anti-friction rollers which support the carriage.

The object of my invention is to provide simple and efficient devices of the character specified.

To the above and other ends which will hereinafter appear, my invention consists of the features of construction, arrangements of parts and combinations of devices to be hereinafter described and claimed.

In the drawings, Figure 1 shows an end elevation of the top portion of a typewriting machine embodying my invention. Fig. 2 is an enlarged detail side elevation of my improved anti-friction roller separator with the rollers in place therein. Fig. 3 is a side view of the same, the parts being disposed at right angles to the position shown in Fig. 2. Fig. 4 is a detail side view of one of the anti-friction roller separator plates. Fig. 5 is a side view of the same taken at right angles to the position shown in Fig. 4. Fig. 6 is an enlarged fragmentary view of the separator with the rollers mounted therein, the parts appearing as they would when viewed from above in Fig. 1.

The top plate 1 of the machine is supported on corner posts 2 and supports upwardly extending lugs 3, 4 which constitute means for supporting the fixed rails 5 and 6 respectively. A carriage 7 supports a cylindrical platen 8 and is formed with rails 9 and 10. Each of the fixed guide rails 5 and 6 has a V-shaped bearing groove 11 and each of the rails 9 and 10 on the carriage likewise has a V-shaped bearing groove 12. The bearing grooves in the fixed rails and in the carriage rails coöperate with crossed anti-friction rollers 13, 14, the axes of the rollers 14 being at right angles or substantially at right angles to the axes of the rollers 13 so that the rollers 13 take the thrust of the carriage in one direction and the rollers 14 receive the thrust of the carriage in another direction. The anti-friction roller separator is formed of two similar plates each designated as a whole by the reference numeral 15 and one of which is shown in detail in Figs. 4 and 5. Each of these plates is preferably made from a blank of sheet metal of uniform thickness and width throughout its length. Each blank is twisted at 16 at two points in the length thereof so that the plane of each end portion 17 of the plate is at right angles or substantially at right angles to the plane of the central portion 18 of the plate and is coincident or substantially coincident with an edge of the central portion 18 as shown in Fig. 4. The plates are brought together in the manner indicated in Figs. 2, 3 and 6 so the twisted portions 16 thereof cross or overlap each other in the manner indicated in Fig. 6.

It will be observed that the central portions 18 of the two plates, or those portions which are between the twists 16, are parallel and are at right angles to the ends 17 which are likewise maintained in parallelism and are spaced apart. The distance between the plates 15 at the central portions 18 thereof and at the ends 17 is the same. The anti-friction rollers 14 are carried by the plates 15 between the twists 16 and are maintained in position between the parallel central portions 18 of the plates by pivots 19 which are in the nature of shouldered rivets and extend through the rollers and are riveted at their ends to the plates 15 to connect them together. The rollers 13 are situated between the parallel end portions 17 of the plates and are connected thereto by pivots 20 which extend at right angles to the pivots 19 and are also in the nature of shouldered rivets which connect the plates together at their ends. Thus it will be seen that the pivots or shouldered rivets 19 and 20 for the crossed anti-friction rollers also constitute means for connecting the two separator plates 15 together and for maintaining them properly spaced apart and free from clamping contact with the sides of the anti-friction rollers. It will also be seen that a line drawn centrally through and longitudinally of the separator will cut the pivots or axes of the different rollers centrally thereof.

From the foregoing description it will be seen that the anti-friction roller separator of my invention is simple in construction, cheap to manufacture and is efficient in use comprising but few parts and that no milling or expensive and laborious work is required to manufacture the separators.

While I have referred herein to the use of anti-friction rollers it should be understood that this term is not used in a restricted sense but is intended to apply to anti-friction balls as well as rollers of the character shown.

Various changes may be made without departing from the spirit and scope of my invention.

What I claim as new and desire to secure by Letters Patent, is:—

1. An anti-friction roller separator comprising two plates, each plate being twisted so that the plane of one portion of each plate is substantially at right angles to the plane of another portion thereof, and anti-friction rollers between said plates.

2. An anti-friction roller separator comprising two plates, each plate being twisted so that the plane of one portion of each plate is substantially at right angles the plane of another portion thereof, anti-friction rollers between said plates, and pivots for said rollers, said pivots extending between and uniting said plates.

3. An anti-friction roller separator comprising two plates, each plate being twisted so that the plane of one portion of each plate is substantially at right angles to that of another portion thereof, anti-friction rollers received between said plates, and pivots for said rollers, certain of said pivots extending at substantially right angles to others and conecting the said plates.

4. An anti-friction roller separator comprising two plates, each plate being twisted at two points in its length so that the plane of the plate at one portion of its length is substantially at right angles to the plane of the plate at another portion of its length, said plates being separated and parallel at said portions thereof which are at right angles to each other, and anti-friction rollers between said plates at the parts thereof which are parallel.

5. An anti-friction roller separator comprising two plates, each plate being twisted at two points in its length so that the plane of the plate at one portion of its length is substantially at right angles to the plane of the plate at another portion of its length, said plates crossing at the points of the twists therein and being separated and parallel at other portions, anti-friction rollers between said plates at the parts thereof which are parallel, and pivots for said rollers, said pivots being in the form of rivets which unite the plates.

6. An anti-friction roller separator comprising two plates, each plate being twisted at two points in its length so that the plane of the plate at the central portion thereof is substantially at right angles to the plane of the plate at the ends thereof, said plates crossing at the points of the twists therein and being separated and parallel at the center and ends thereof, crossed anti-friction rollers between said plates at the parts thereof which are parallel, and pivots for said rollers, said pivots being in the form of rivets which extend at substantially right angles to one another and unite the plates.

7. An anti-friction roller separator comprising two sheet metal plates each plate being twisted at two points in the length thereof, so that the ends of each plate are in one plane and the plane of the central portion is at substantially right angles to the plane of the ends, said plates crossing at the points of the twists therein, and anti-friction rollers between said plates.

8. An anti-friction roller separator comprising two sheet metal plates each plate being twisted at two points in the length thereof, so that the ends of each plate are in one plane and the plane of the central portion is at substantially right angles to the plane of the ends, said plates crossing at the points of the twists therein, the ends of the plates when combined being in parallel planes and the central portions of the plates being in parallel planes at substantially right angles to the planes of the ends, crossed anti-friction rollers located between said plates at both sides of the twists therein, and crossed pivots for said anti-friction rollers, said pivots securing said plates together.

9. An anti-friction roller separator comprising two sheet metal plates each twisted so that the plane of one portion thereof is at substantially right angles to the plane of another portion and substantially coincident with an edge of said other portion, crossed rollers between said plates, and means for securing said plates together, the construction and arrangement being such that a line extending longitudinally and centrally of the separator will pass centrally through the axes of all the rollers.

Signed at Ilion, in the county of Herkimer and State of New York, this fifth day of July A. D. 1907.

CHARLES A. THISTLETHWAITE.

Witnesses:
HERBERT J. ROBBINS,
CHAS. E. MAURICE.